UNITED STATES PATENT OFFICE.

WALTER BADER, OF MANCHESTER, ENGLAND, ASSIGNOR TO LEVINSTEIN LIMITED, OF BLACKLEY, MANCHESTER, ENGLAND.

PRODUCTION OF AMINOALKYLESTERS AND OF ALKYLAMINOALKYLESTERS OF PARA AMINOBENZOIC ACID.

1,396,913. Specification of Letters Patent. Patented Nov. 15, 1921.

No Drawing. Application filed October 11, 1917. Serial No. 195,958.

*To all whom it may concern:*

Be it known that I, WALTER BADER, a citizen of the Republic of Switzerland, and a resident of Prestwich Park, Manchester, in the county of Lancaster, England, have invented certain new and useful Improvements in the Production of Aminoalkylesters and of Alkylaminoalkylesters of Para Aminobenzoic Acid, of which the following is a specification.

This invention relates to an improvement in the production of aminoalkylesters and of alkylaminoalkylesters of para aminobenzoic acid.

It has been stated that the alkaminoesters of para-aminobenzoic acid can be produced by heating para aminobenzoic alkylesters with amino alcohols of alkylamino alcohols. We have, however, found this method of production to be useless as a technical process and it was only possible to obtain a very small yield even by prolonged heating on preparing the most important member of this class, namely, the diethylaminoethylester of para aminobenzoic acid. The addition of alkaline condensing agents acts as is well known advantageously, but an enormous excess of diethylaminoethylalcohol is required to obtain a somewhat satisfactory yield. The product thus obtained is, however,—owing to the presence of alkaline agents—of a dark color and requires lengthy and costly purification before it is marketable.

I have now found that the production of aminoalkyl and alkylaminoalkyl esters of para aminobenzoic acid proceeds easily and completely if the para aminobenzoicalkyl esters are treated with the amino alcohol or the alkylamino alcohol in presence of a small quantity (say about 2%) of the aluminium compound of the alcohol, acting as catalyzer. The aluminium compound of these alcohols can be either prepared by the well known methods and added to the mixture of para aminobenzoicester and amino alcohol or alkamino alcohol, or such aluminium compounds can be added to this mixture as will be capable of forming the aluminium compound of the alcohols. Heating, for instance, of a mixture of para aminobenzoic-ester with diethylaminoethyl alcohol (slightly in excess of the theoretical quantity required) and 2% of the catalyst, the ethylic alcohol set free in the reaction being allowed to distil off, suffices to produce a practically complete conversion and the product thus obtained is of such excellent quality as to yield by a simple purification the chemically pure body.

The following may serve as an example of how to carry out the new process, but I do not limit myself to the details therein given.

*Example.*

10 lbs. para aminobenzoic ethyl ester
10 lbs. diethylaminoethanol
4–8 ozs. of the aluminium compound of diethylaminoethanol are heated together to a temperature from 150° C.–180° C., the ethyl alcohol formed by the reaction being allowed to distil over. As soon as the distillation of ethyl alcohol ceases, the excess of diethylaminoethanol present in the product of reaction is removed by continuing the distillation for example at 27 to 28 inches vacuum until the temperature of the liquor has risen to 170° C. Distillation is then stopped and the residue is then poured into cold water and neutralized with hydrochloric acid. Any unconverted aminobenzoic ethyl ester which may still be present, remains undissolved and is removed by filtration. From the filtrate, the diethylaminoethyl ester of para-aminobenzoic acid may be precipitated by caustic soda and the hydrochlorid obtainable from it forms a pure white salt.

Instead of adding the aluminium compound of diethylaminoethanol to the mixture of para aminobenzoic ethyl ester and diethylaminoethanol, it may be formed in the mixture by adding for instance 2% of aluminium amalgam and proceeding as above described.

The expression "amino-alcohol" is used herewith with the understanding that it comprehends alkylamino alcohols.

What I claim as my invention and desire to secure by Letters Patent is:—

1. The improvement in the production of aminoalkyl and alkylaminoalkyl esters of para aminobenzoic acid, which improvement consists in heating the para aminobenzoic alkylesters with an amino-alcohol in the presence of a small quantity of an aluminium compound of the alcohol acting as catalyzer, substantially as described.

2. The improvement in the production of aminoalkyl and alkylaminoalkylesters of para aminobenzoic acid, which improvement consists in heating the para aminobenzoic alkylesters with an amino-alcohol and an aluminum compound adapted to form an aluminum compound of the alcohols.

3. The improvement in the production of aminoalkyl and alkylaminoalkyl esters of para aminobenzoic acid, which improvement consists in heating the para aminobenzoic alkylesters with alkylamino alcohol in the presence of a small quantity of an aluminum compound of the alcohol acting as a catalyzer.

In witness whereof I have hereunto set my hand.

WALTER BADER.